United States Patent [19]

Zhou et al.

[11] Patent Number: 5,974,200

[45] Date of Patent: *Oct. 26, 1999

[54] METHOD OF LOCATING A MACHINE READABLE TWO DIMENSIONAL BARCODE WITHIN AN IMAGE

[75] Inventors: Jiangying Zhou, Plainsboro; Daniel P. Lopresti, Hopewell, both of N.J.

[73] Assignee: Matsushita Electric Industrial Company, Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,347

[22] Filed: Mar. 20, 1997

[51] Int. Cl.$^6$ ....................................................... G06K 9/32
[52] U.S. Cl. .......................... 382/298; 382/257; 382/287; 235/462.1
[58] Field of Search ..................................... 382/317, 232, 382/168, 298, 256, 259, 308, 176, 287, 275, 260; 235/462.07, 494, 462.08, 462.1, 462.19

[56] References Cited

U.S. PATENT DOCUMENTS

| | | | |
|---|---|---|---|
| 4,750,209 | 6/1988 | Shimura et al. | 382/176 |
| 4,948,955 | 8/1990 | Lee et al. | 235/42.08 |
| 4,988,852 | 1/1991 | Krishnan | 235/462.08 |
| 5,065,437 | 11/1991 | Bloomberg | 382/176 |
| 5,404,003 | 4/1995 | Smith | 235/462.1 |

Primary Examiner—Leo H. Boudreau
Assistant Examiner—Ishrat Sherali
Attorney, Agent, or Firm—Amster, Rothstein & Ebenstein

[57] ABSTRACT

A method of locating a machine-readable two dimensional marker, such as a barcode, in an image. An image of a medium containing the two dimensional marker is processed to generate a mask containing one or more filled regions each of which is sufficiently large to contain the predetermined dimensions of the marker. To generate the mask, small image areas having a first pixel polarity which are internal to larger image areas having a different pixel polarity are first filled with pixels having the same polarity as the surrounding larger image areas. A morphological opening operation is then performed on the filled image to leave only such filled regions as are equal in size or larger than the predetermined dimensions of the marker. After the mask has been generated, the mask is logically combined with the original image to extract one or more candidate regions. The candidate regions are then tested to determine whether or not a marker is present by one of several described methods, including, for example, by attempting to decode portions of each candidate region. Based upon the results of the testing, one or more candidate regions are selected for decoding.

11 Claims, 10 Drawing Sheets

METHOD OF LOCATING A MACHINE READABLE TWO DIMENSIONAL BARCODE WITHIN AN IMAGE

The present invention relates to optical machine recognition stems and more specifically to a method for locating a two dimensional machine-readable marker in an image to permit the marker to be decoded.

BACKGROUND OF THE INVENTION

Spurred by recent advances in machine recognition systems, machine-readable markers (e.g. one and two-dimensional barcodes) are being increasingly incorporated in media used to convey information for recognition by both humans and machines. For example, one-dimensional barcodes have been incorporated on labels applied to merchandise articles, which labels can be both read by humans and scanned by machines, with operator assistance, as at supermarket checkout counters. Both one and two dimensional barcodes have been incorporated on human-readable media, such as airway bills and facsimile order sheets which can be automatically scanned to facilitate communication of information to both humans and machines handling the media.

A number of patents describe systems which locate one or two-dimensional barcodes by searching for predetermined position marks placed in the vicinity of the barcodes. For example, U.S. Pat. Nos. 4,736,109 and 5,241,166 describe systems in which concentric ring markings are placed close to the area of encoded information to facilitate locating a two-dimensional barcode from within an image.

Other patents describe systems which analyze an image to locate a predetermined "finder" pattern which appears in a barcode (U.S. Pat. No. 5,189,292), or to locate predetermined "start and stop" patterns of a barcode (U.S. Pat. No. 5,304,787). Another system described in U.S. Pat. No. 5,262,623 locates a one-dimensional barcode by searching for a predetermined two-dimensional marking within an image.

Other prior art references describe systems which locate one-dimensional barcodes by locating portions of an image which exhibit one or more properties of the barcode. For example, U.S. Pat. No. 4,988,852 describes a system which locates one-dimensional barcodes by counting pixel transitions within different portions of an image and comparing the counts thus obtained to a predetermined count value which is characteristic of known barcodes. Another system described in U.S. Pat. No. 5,073,954 locates one-dimensional barcodes by creating and analyzing horizontal and vertical histograms of the image.

The Article "Bar Code Localization Using Texture Analysis," authored by Jain et al. and published in *Proceedings of the Second International Conference on Document Analysis and Recognition* in October, 1993 describes a method of locating one-dimensional barcodes through multiple channel Gabor filtering of the image. Based on such filtering, one or more portions of the image which exhibit high "radial" frequencies at given angles are identified as containing a one-dimensional barcode.

The Article "Bar Code Location Algorithm Using a Two-Dimensional Approach" authored by Viard-Gaudin, also published in *Proceedings of the Second International Conference on Document Analysis and Recognition* in October, 1993 describes a system which locates one-dimensional barcodes by determining a "density of mono-oriented gradient", i.e. by analyzing the rate at which changes in pixel polarity occur along given directions within the image. Portions of the image where such density is highest are determined to contain a one-dimensional barcode.

While existing systems are described as being capable of locating one-dimensional barcodes by matching image characteristics to properties of the one-dimensional barcode, no such system has heretofore been known for locating two-dimensional barcodes.

Accordingly, it is an object of the present invention to provide a method of locating a two-dimensional machine-readable marker containing encoded information from within an image, without requiring special locator markings to be placed in the vicinity of the marker.

A further object of the invention is to perform morphological operations and a statistical analysis to locate a machine-readable marker having predetermined size, shape and pixel distribution (i.e. texture) characteristics.

Still another object of the invention is to provide a method of locating a two-dimensional marker which has a random and homogeneous distribution of cells of first and second (e.g. black and white) pixel polarities.

A further object of the invention is to provide a method of locating a two-dimensional machine-readable marker which does not require a computationally intensive manipulation of a pixel distribution over an entire image.

SUMMARY OF THE INVENTION

These and other objects are provided by the method of locating a machine-readable marker of the present invention. According to the present invention, an image of a medium containing a machine-readable marker is processed to generate a mask containing one or more filled regions each of which is sufficiently large to contain the predetermined dimensions of the marker. To generate the mask, small image areas, i.e. "holes", having a first pixel polarity (e.g. "white") which are internal to larger image areas having a different pixel polarity (e.g. "black"), are first filled with pixels having the same polarity as the surrounding larger image areas. A morphological opening operation is then performed on the filled image to leave only such filled regions as are equal in size or larger than the predetermined dimensions of the machine-readable marker.

After the mask has been generated, the mask is logically combined with the original image to extract one or more candidate regions. The candidate regions are then tested to determine whether or not a machine-readable marker is present, for example, by attempting to decode portions of each candidate region. Based on the results of the test, one or more candidate regions are selected for decoding.

In a preferred embodiment of the invention, an additional dilating operation is performed which slightly increases the size of the filled regions of the mask to aid in extracting the machine-readable marker. After the candidate regions are extracted, regions are preferably further selected for decoding based upon an analysis of the texture, i.e. the pixel distribution, within each candidate region.

Preferably, the image is scaled down prior to generating the mask, to reduce its resolution and thereby reduce the number and/or complexity of computations involved in the filling and opening operations which are performed. The mask is then restored to the scale of the original image prior to extracting the candidate regions.

In a preferred embodiment of the invention, a texture-based analysis of candidate regions is performed by one or both of the following operations: (1) testing candidate regions to check for the presence of long runs of pixels having a single polarity, e.g. white; and (2) testing candidate regions to determine whether the difference in shade between the image and a reciprocal, i.e. 'negative', of the image is greater than a predetermined limit. Regions having long runs are determined to contain non-marker information and are accordingly eliminated as candidates for decoding. Regions in which the differences in shade between the image and the negative thereof exceed the predetermined limit are also determined to contain non-marker information and are eliminated as candidates.

BRIEF DESCRIPTION OF THE DRAWINGS

FIG. 2b is a negative image of the photographic image in FIG. 2a.

FIG. 4b represents a mask generated from an image after a morphological opening operation is performed on the image of FIG. 4a.

DETAILED DESCRIPTION OF THE PREFERRED EMBODIMENTS

Figure 1A:
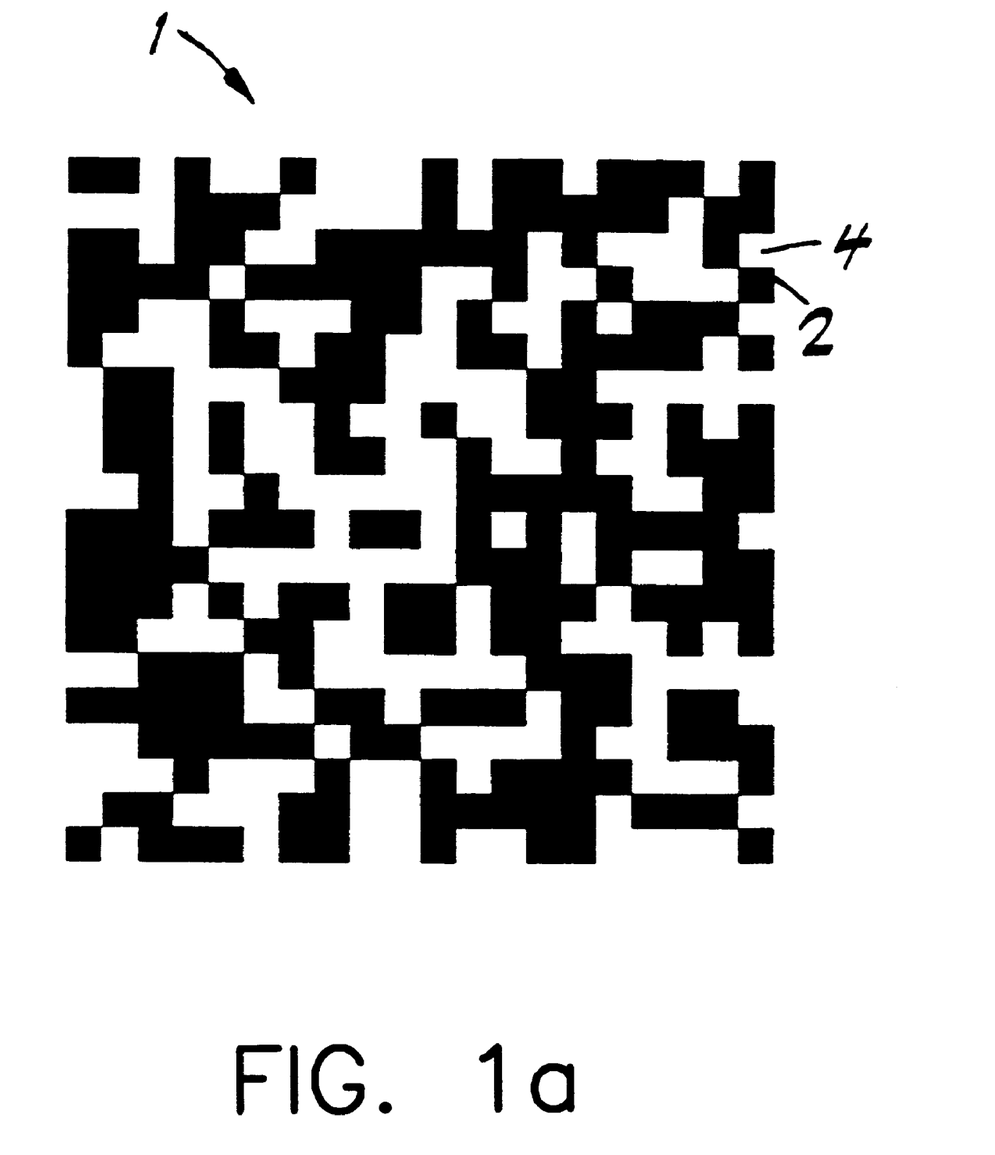
FIG. 1a is an enlargement of a representative two-dimensional machine-readable marker which the invention is primarily designed to locate.

FIG. 1a is an enlargement of a representative two-dimensional machine-readable marker as disclosed in our co-pending U.S. patent application Ser. No. 08/569,280, which Application is incorporated herein by reference. As will be understood, the machine-readable markers which the present invention is designed to locate conform to predetermined uniformity and randomness criteria. As shown in FIG. 1a, a representative marker 1 printed on an optically scanable medium, e.g. a page, contains a uniform, roughly 1:1 pseudo-random distribution of cells each having a first pixel polarity or a second pixel polarity (shown representatively as black and white cells, respectively). Each black cell 2 and each white cell 4 encodes a binary bit of information.

In the embodiments of the invention to be described in the following, the cells of the machine-readable marker are described as having either "black" or "white" pixel polarity. However, it will be understood that the principles and specific techniques of the invention disclosed herein apply equally to machine-readable markers in which each cell is encoded in one of two possible "colors", so long as cells of each of two "polarities" can be distinguished by scanning, e.g. on the basis of intensity of light which is reflected from the marker, at one or at a plurality of wavelengths.

Figure 1B:
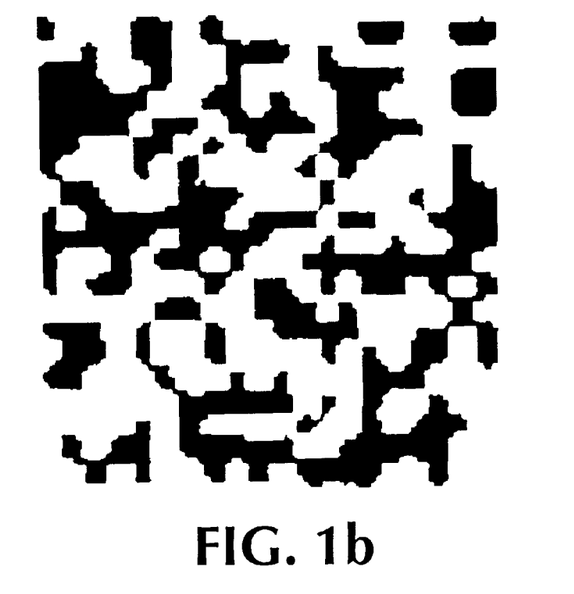
FIG. 1b is an enlarged scanned image of a representative two-dimensional machine-readable marker.

FIG. 1b shows a representative example of a digitized image of a machine-readable marker which is obtained as by scanning. The cells of the marker, as appearing within the digitized image, each contain a number q×q pixels forming a square of dimension q pixels on each side, in which each of the q×q pixels have the same black or white pixel polarity. The number q represents the resolution of the marker and is determined by several factors including the resolution of the encoding system and the resolution of the system which scans the medium containing the marker.

As a consequence of the black and white cells being distributed randomly in the machine-readable markers described herein, markers have no white "holes" or black inclusions larger than a maximum determined by the relative probability of such distribution occurring randomly. The probability that a given region of size 4 q×4 q cells will occur is less than $(0.5)^{16}=0.0000153$.

Figure 1C:
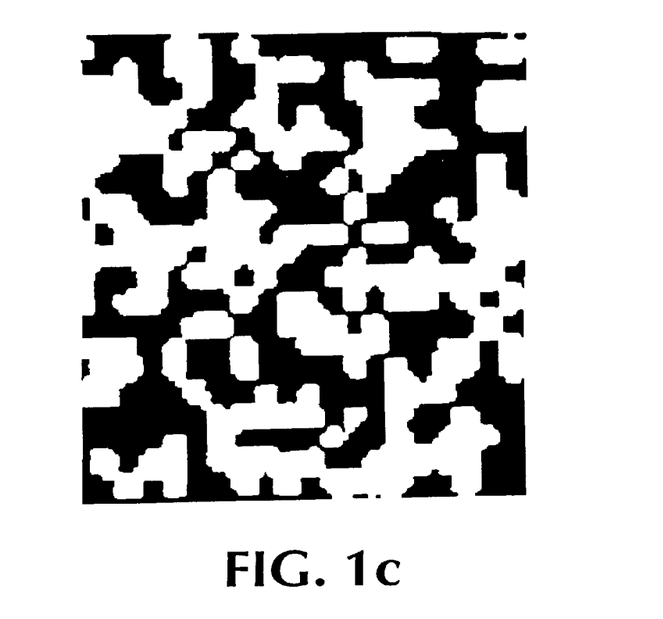
FIG. 1c is an enlarged negative of a scanned image of the two-dimensional machine-readable marker in FIG. 1b.

As is further apparent from the marker shown in FIG. 1a and the scanned image of a marker in FIG. 1b, the marker has a uniform distribution of black and white cells such that the density of black cells is about equal to the density of white cells throughout each portion of the marker, thereby resulting in an overall grey tone, i.e. "shade", which is neutral. Thus, if the polarity of each pixel in the scanned marker shown in FIG. 1b is reversed to produce a 'negative' image, such as that shown in FIG. 1c, the respective black cell and white cell densities of the negative image will have an overall grey tone, i.e. "shade", which varies only slightly from the shade of the original marker.

Figure 2A:
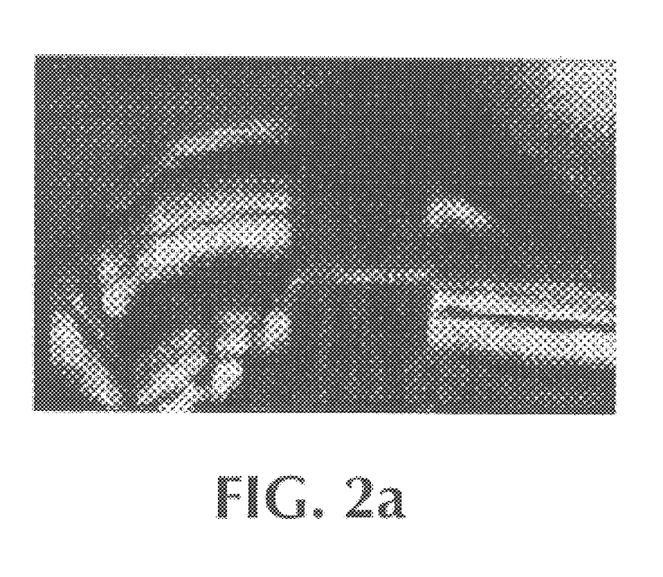
FIG. 2a is a photographic image.
Figure 2B:
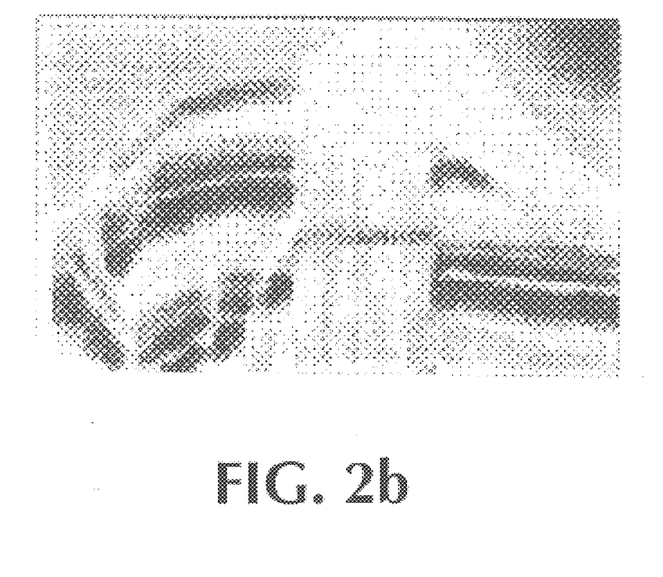

By contrast, such uniform pixel distribution is usually not present in photographic images FIG. 2a contains a photographic image and FIG. 2b contains a negative image of the same photographic image. As is apparent from a comparison of FIG. 2a to FIG. 2b, the two images have overall shades which vary substantially with respect to each other. As is apparent, FIG. 2a has an overall shade exhibiting higher black pixel density and the negative image in FIG. 2b has an overall shade exhibiting substantially higher white pixel density.

Bearing in mind the properties of the machine-readable markers described herein, a method of locating a marker according to the present invention is described with reference to FIG. 3. For each of the embodiments of the invention as will be further described, the method of the present invention is applied to a digitized image of a medium containing a marker which exhibits appropriate characteristics. The method by which the digitized image is obtained is not pertinent to the operation of the invention, as such image can be obtained by scanning a paper medium, or from any available source, e.g. local or network database, remote user, broadcast transmission, etc.

In all of the embodiments of the invention as will be described, a mask is generated from the digitized image and then applied to extract one or more candidate regions. Once candidate regions have been extracted, the selection of regions to be decoded can be further narrowed by: (1) attempting a trial decoding of each candidate region; or by (2) analyzing the pixel distribution (texture) within each candidate region and discarding candidate regions which do not conform to known properties of the machine-readable markers described herein.

Figure 3:
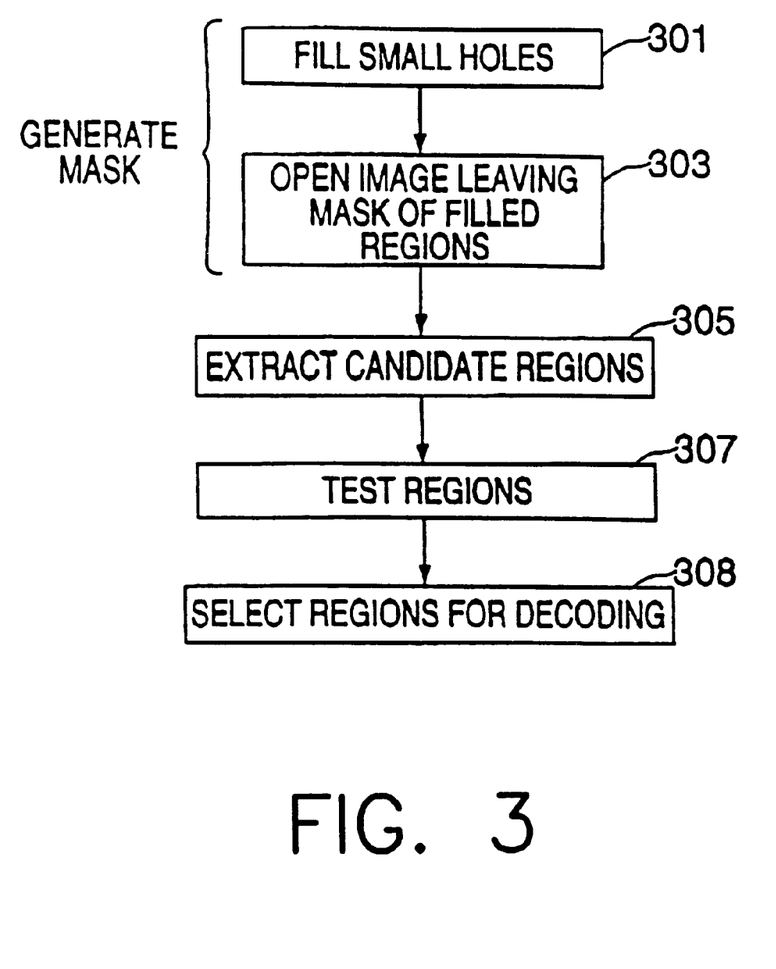
FIG. 3 is a flowchart of operations performed in accordance with the present invention.
Figure 4A:
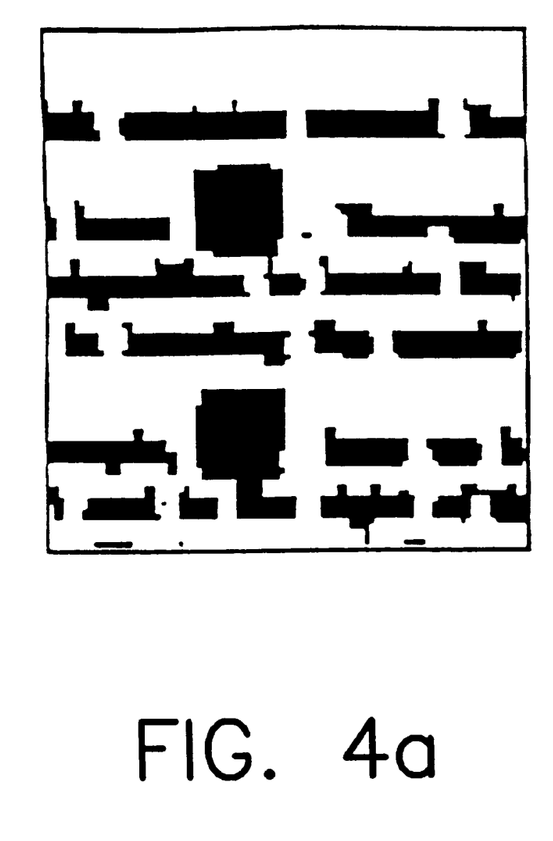
FIG. 4a represents an image having filled regions after a morphological closing operation is performed to fill holes therein.

With reference to FIG. 3, in steps 301 and 303, a mask for locating candidate regions is generated. In step 301, a morphological "closing" operation is performed to fill small "holes" of the image which have a first pixel polarity, e.g. white, which are included within larger regions having a different pixel polarity, e.g. black. In view of the low probability that holes of size 4 q×4 q pixels will occur within a machine-readable marker because of the uniform and random properties thereof, the closing operation is performed to fill all holes which are smaller than 4 q pixels in either one or both dimensions. As a result of filling such small holes, areas of the digitized image are defined as potentially containing markers. When the digitized image has a white background, the filling operation is performed to fill white holes with pixels having black polarity. Alternatively, when the digitized image has a darker background, this operation can be performed by "whiting out" small black pixel areas which are included within larger regions having white pixel polarity. FIG. 4a illustratively represents an image in which white holes have been filled. As is apparent from FIG. 4a, filled regions appear as areas having uniform pixel polarity (being, in this case, black).

Figure 4B:
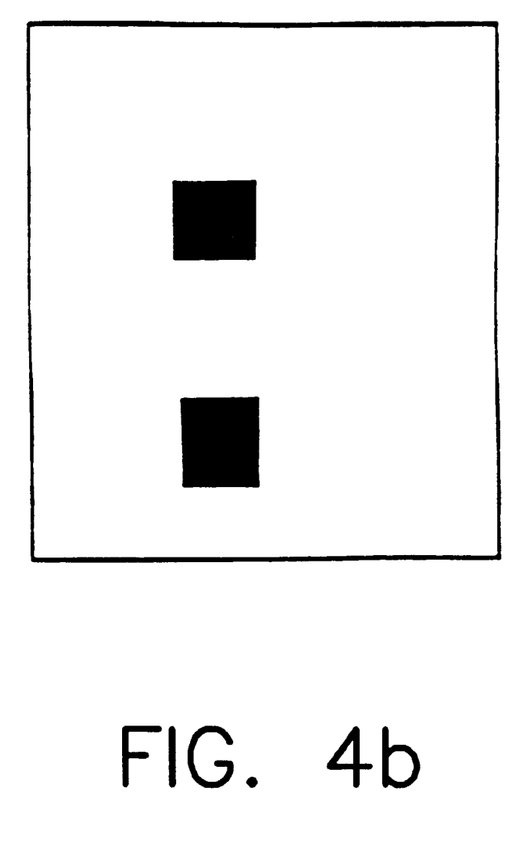

After the image has been processed to fill small holes, a morphological opening operation is performed to eliminate filled regions of the image which are too small or which are of the wrong shape and cannot accommodate the predetermined dimensions and shape of a marker. This operation is performed, for example, by matching the filled regions of the element with a structure element having the same shape as a marker and the same or slightly smaller dimensions than the dimensions of a marker as described herein. As shown in FIG. 4b, the result of the opening operation is a mask containing one or more filled regions, each region of which has dimensions and shape sufficient to accommodate the predetermined dimensions and shape of a marker.

After the mask has been generated, it is then logically combined with a stored copy of the digitized image to extract one or more candidate regions for further testing in accordance with the present invention. In the embodiment of the invention shown in FIG. 3, a trial decoding is attempted of the information which appears in each candidate region. If the trial decoding is successful, that candidate region is identified as containing a machine-readable marker and is selected for further processing. However, if the trial decoding is unsuccessful, i.e., produces results which are inconsistent with the machine-readable markers described herein, that region is eliminated as a candidate for further processing.

Figure 5:
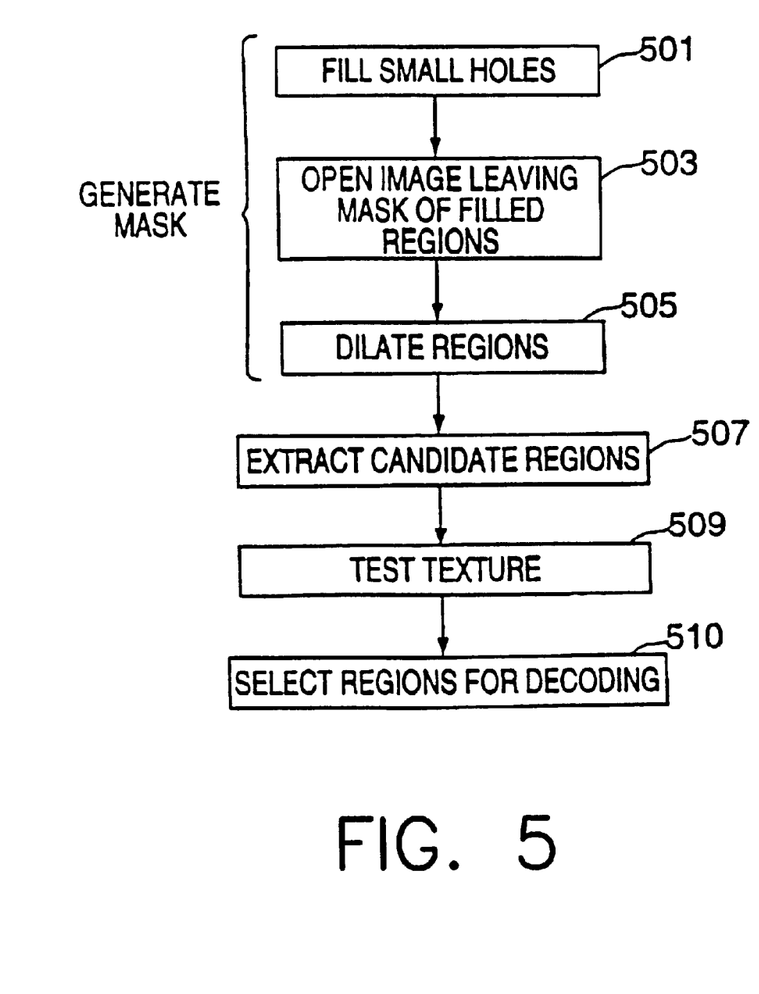
FIG. 5 is a flowchart of operations performed in accordance with a first preferred embodiment of the invention.

FIG. 5 is a flowchart showing the operations which are performed according to a preferred embodiment of the invention. In this embodiment, all operations are the same as those described with reference to FIG. 3 except for the operations conducted in steps 505 and 509. In this embodiment, step 505 is added to perform a "DILATE" operation on the filled regions which result from the opening operation of step 503. In-this operation, filled regions are isotropically dilated on each side thereof by a number of pixels, which number is determined in accordance with the resolution of the marker and the digitizing system. Performance of this operation helps to improve decoding of marker regions which appear to have information distributed over a slightly larger area than the area occupied by the originally encoded marker due to various sources of distortion, e.g. misalignment, introduced by scanning the medium.

In the embodiment of the invention shown in FIG. 5, an alternative operation "TEST TEXTURE" (step 509) is performed instead of the operation "TEST REGIONS" (step 307) which is conducted in the embodiment of the invention described with reference to FIG. 3 above. In this operation, the texture within candidate mark regions, i.e. the distribution of pixels of each polarity, is analyzed to determine if it conforms to one or more known properties of the machine-readable markers described herein. Specific operations for testing the texture within candidate mark regions are described below with reference to FIGS. 6–9 below. Based on the determinations made with respect to the texture within candidate regions, regions are selected for decoding in step 511.

Figure 6:
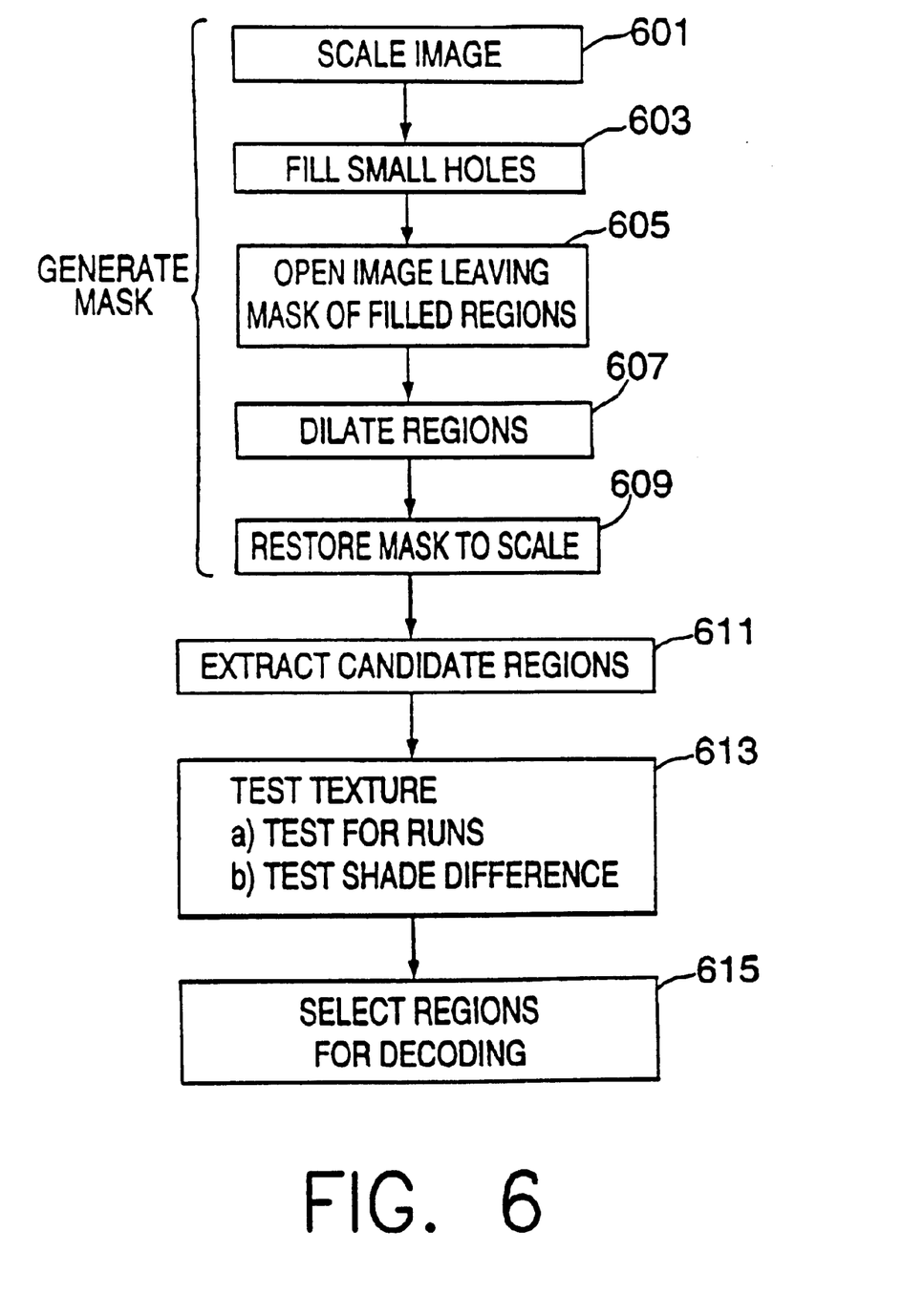
FIG. 6 is a flowchart of operations performed in accordance with a second preferred embodiment of the invention.

FIG. 6 contains a flowchart showing the operations of the invention according to another preferred embodiment of the invention. In this embodiment of the invention, all operations are the same as those described with reference to FIGS. 3 and 5 above with the exception of the operations performed in steps 601, 609 and 613. In Step 601, a scaling operation is performed by averaging pixel polarities of the digitized image over small areas to produce a version of the image which is scaled down by a factor of $\lambda$. Scaling is performed for two purposes: (1) to reduce the number of computations required to perform the morphological operations in steps 603 and 605; and (2) to effectively "smear" small discontinuities, e.g. "holes", in marker-containing regions into more uniform regions to produce effects similar to that which result from the morphological closing (hole-filling) operation in step 603.

An algorithm which can be used to perform the scaling operation is described as follows. For each image I comprised of a two-dimensional array $[k,l]_{n \times m}$ of image elements (pixels), let $[i,j]_{n\lambda \times m/\lambda}$ represent a condensed version of the same two-dimensional image after scaling, and let $C(i,j)$ denote the black and white values assigned to pixels at each position (i,j) of the array. The scaling of the image I by a factor X is defined by the equation:

$$C(i, j) = \begin{cases} 0 & \text{if } \sum_{k=\lambda i}^{k=\lambda(i+1)-1} \sum_{l=\lambda j}^{l=\lambda(j+1)-1} C(k, l) = 0 \\ 1 & \text{otherwise} \end{cases} \quad (1)$$

After the morphological operations of steps 603, 605 and 607 are performed to produce a mask containing one or more filled regions, in step 609 the mask is restored to the scale of the original digitized image. This operation, which can be described as "up-scaling", is defined by the following equation:

$$C(k, l) = \begin{cases} 1 & \text{if } C(i, j) > 0: \; i = k/\lambda, j = l/\lambda \\ 0 & \text{otherwise} \end{cases} \quad (2)$$

After the mask has been generated, in step 611 the mask is logically combined with the digitized image to extract one or more candidate regions of the image. The texture of the image in candidate regions, i.e. the distribution of pixels of different polarities, is then analyzed in step 613 to determine whether it is consistent with the texture of a marker as described herein. In performing this analysis, one or both of the following operations are conducted to determine texture-based parameters $f_1$ and $f_2$ for the candidate regions. First, an analysis is performed to determine the number $f_1$, if any, of row runs or column runs within candidate regions of the image.

Row runs and column runs are defined as follows. For each candidate region m having a bounding box of horizontal dimension $W_m$ and of vertical dimension $H_m$, a row run of unit t is defined as an unbroken horizontal row of pixels which have the same polarity (e.g. black or white), which extends in the horizontal direction by least $W_m/2$, and which has thickness h which is greater than or equal to t. A column run of unit t is defined as an unbroken vertical column of pixels which have the same polarity (e.g. black or white), which extends in the vertical direction by at least $H_m/2$, and has thickness w which is greater than or equal to a value t.

As described above, the machine-readable markers with which the invention is primarily designed to operate have a uniform pseudo-random distribution of black and white cells, such that row runs and column runs are not present within markers as originally encoded on media. By contrast, regions within media which contain text, graphics or photographs generally contain such runs. Text regions of a scanned image generally contain white row runs because successive lines of text are separated by blank space. As an illustration, at a relatively low scanning resolution of 300 dpi, when successive lines of text are separated by an atypically small blank space of only one point in width, even under such extreme conditions row runs appear between the scanned lines of text which have a vertical dimension greater than four pixels.

When a medium containing a marker is scanned to produce a digitized image, it is possible that runs of very limited thickness, e.g. one pixel, will appear within regions of the image containing markers due to distortion effects introduced in the scanning process, e.g. quantization distortion. Therefore, for optimum performance, the operations described herein which test for the presence of row runs or column runs should be set to ignore runs which are thinner than a predetermined value such as two pixels in thickness.

A second analysis may be performed in addition to, or as an alternative to the row run and column run analysis described above. In this analysis, the shade g(i,j) at each pixel position within candidate regions of the image is determined by averaging the pixel polarities which occur within a neighborhood N(i,j) of a predetermined number of pixels which surround the pixel at each position, according to the equation:

$$g(i, j) = \sum_{(l,k) \in N(i,j)} C(k, l)/(2\beta + 1)(2\beta + 1) \qquad (3)$$

where (i,j) denotes the row and column position, $(2\beta+1)(2\beta+1)$ the number of pixels in the neighborhood of the pixel located at position (i,j), and C(k,1) the polarity of each pixel.

Once the shade at each pixel position within candidate regions is determined, a value representative of the difference between the overall shade of the image within the candidate region and the overall shade of the reciprocal (negative) of the image is obtained according to a formula such as:

$$f_2 = \sum_{(i,j) \in m_i} |g(i, j) - \overline{g}(i, j)|/H_{m_i} W_{m_i} \qquad (4)$$

Figure 7:
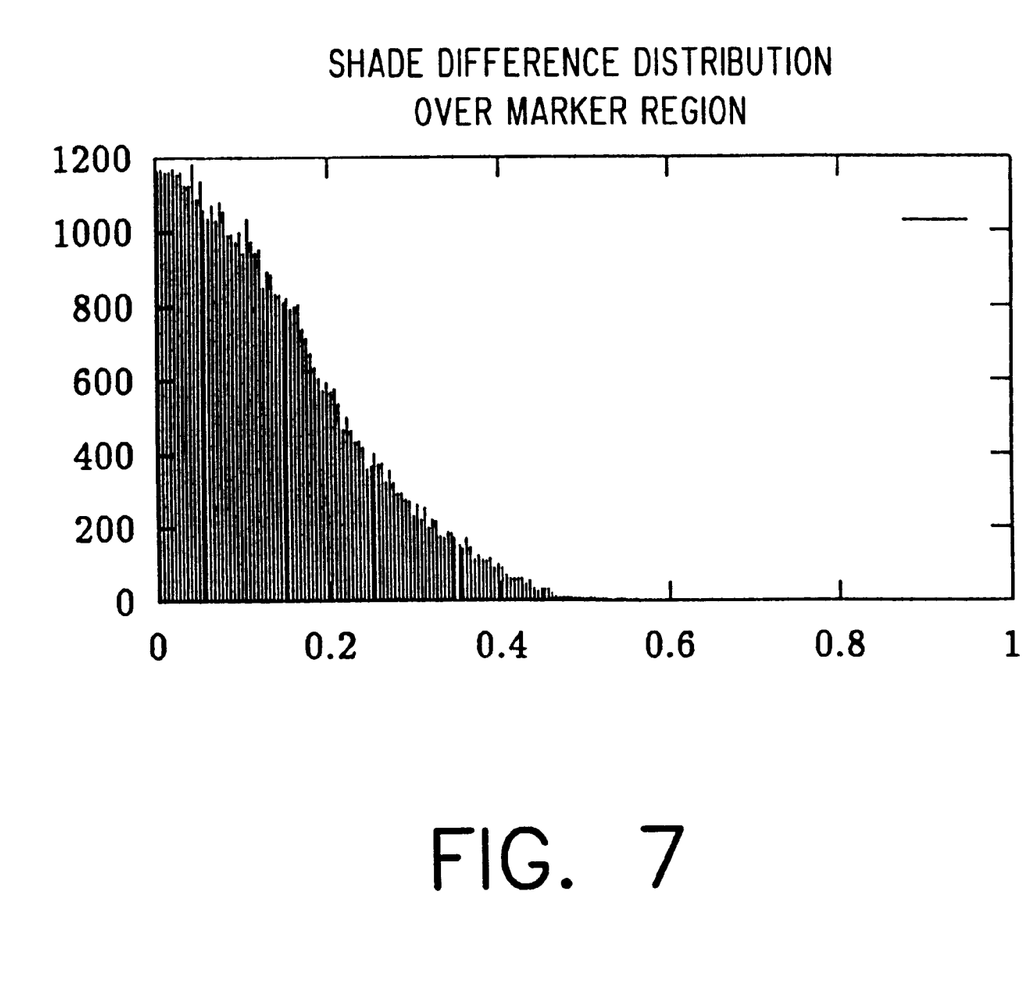
FIG. 7 is a graph showing the distribution of shade differences over a region of an image containing a two-dimensional machine-readable marker.
Figure 8:
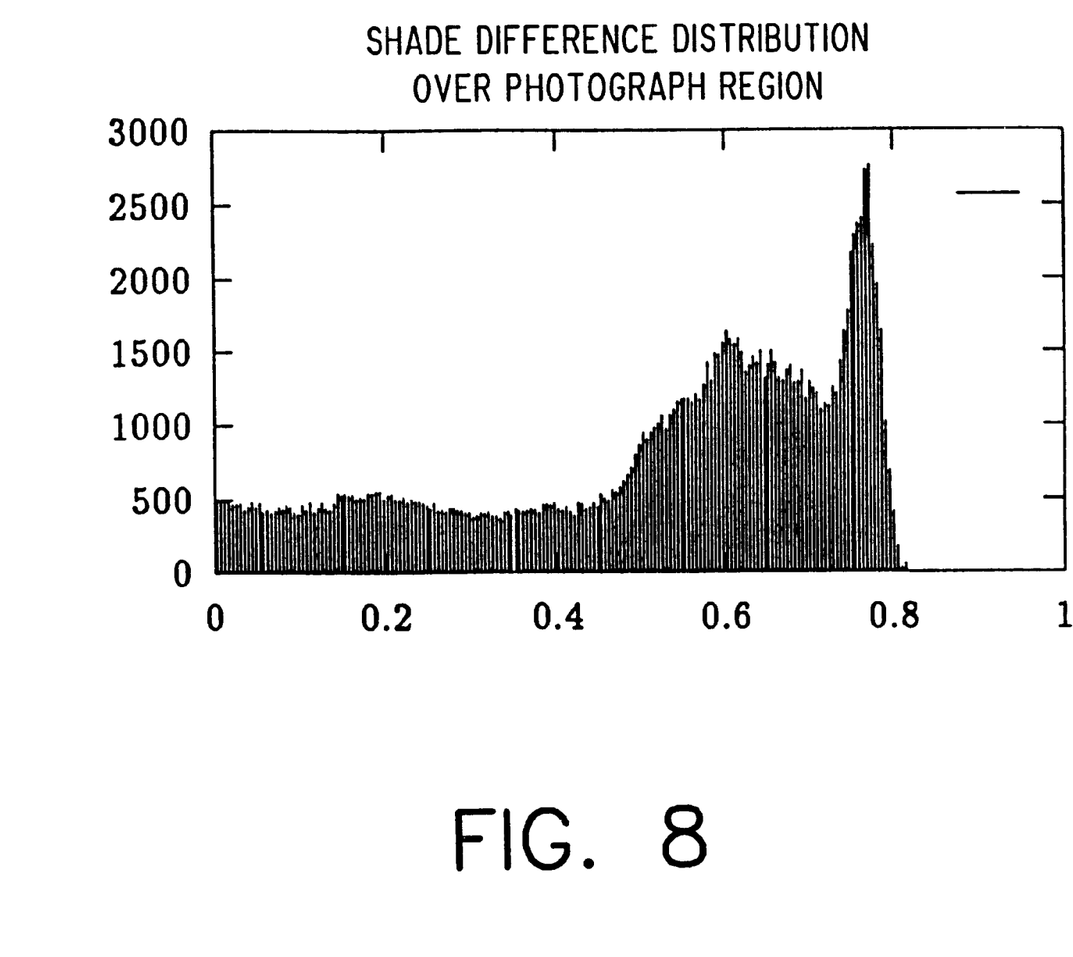
FIG. 8 is a graph showing the distribution of shade differences over a region of an image containing a photograph.

FIG. 7 represents a distribution of shade difference values which are obtained by computing the differences in the shade $|g(i,j)-\overline{g}(i,j)|$ for each pixel position within a marker-containing region of an image. FIG. 8 represents a distribution of shade difference values which are obtained for each pixel position within a photograph-containing region of an image. As will be understood from FIG. 7, the shade difference values over the marker-containing region have a distribution which is gaussian in appearance, weighted toward zero shade difference, and which lies mainly between zero and 0.4. By contrast, the shade difference values over the photograph-containing region in FIG. 8 have a distribution which is weighted toward a higher shade difference of about 0.8, and extends over a greater portion of the scale. It will be appreciated that analysis of regions containing graphics will produce shade difference values which are distributed over a greater portion of the scale and are weighted more heavily towards the value 1 than regions which contain the markers described herein.

As a consequence, it will be understood that marker-containing regions can be distinguished from photograph-containing or graphics-containing regions based on whether the value $f_2$ lies above or below 0.4. When the value $f_2$ calculated for a candidate region is greater than 0.4, a determination is made that the candidate region contains a photograph or graphics. Conversely, when the value $f_2$ calculated for a candidate region is not greater than 0.4, a determination is made that the candidate region contains a marker. It will be appreciated that the 0.4 value used to delineate marker-containing regions from non-marker containing regions is illustrative and may differ depending upon the particular algorithm used to calculate the shade difference values and the conditions, e.g. background shading, under which the image has been digitized.

Figure 9:
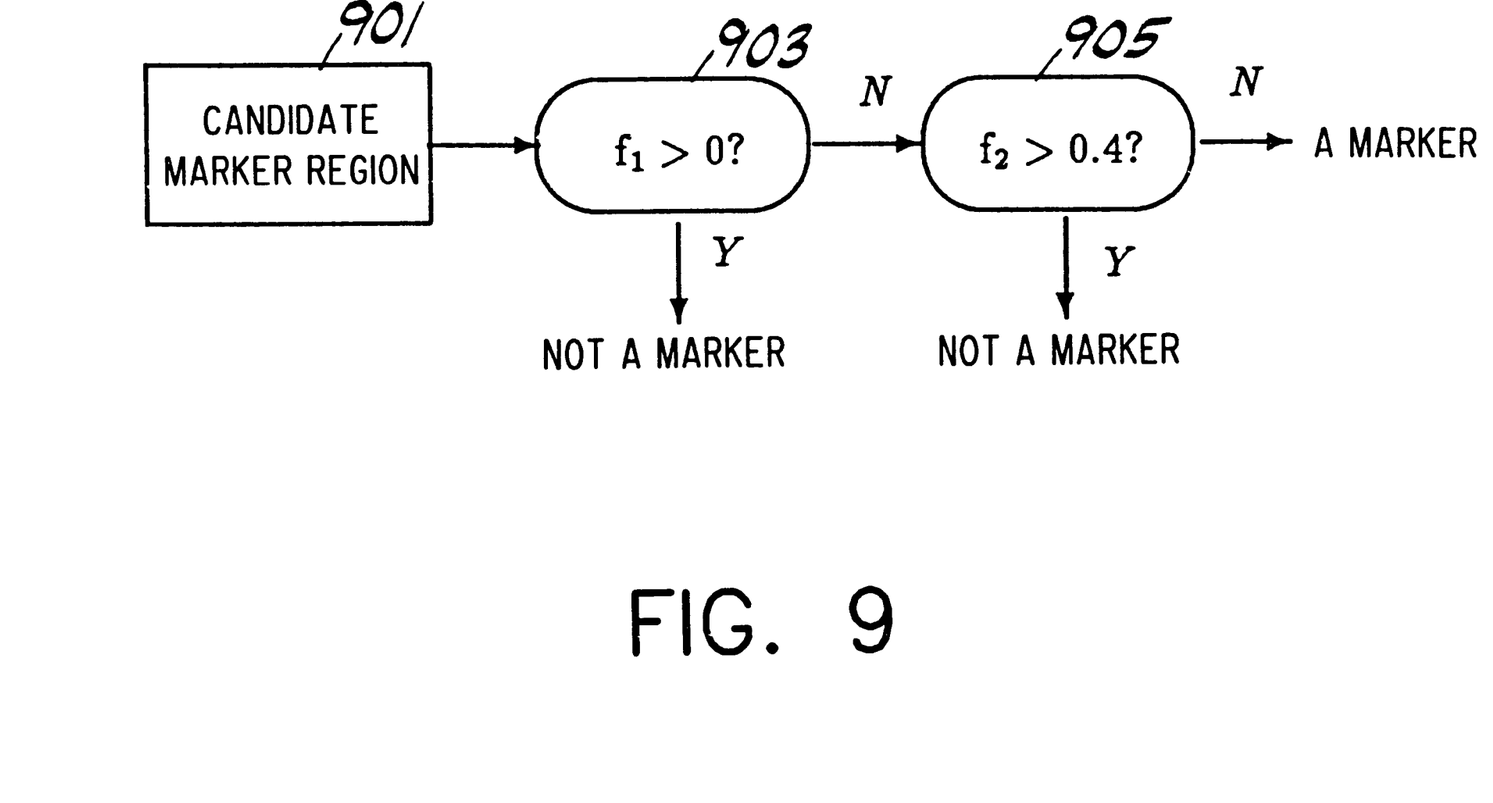
FIG. 9 is a diagram showing operations performed to determine whether a candidate region of an image contains a two-dimensional machine-readable marker.

Finally, FIG. 9 illustrates a process for determining, via texture-based criteria, whether a marker is present in a particular candidate region. As shown in FIG. 9, a determination is made in block 903 as to whether a candidate region 901 contains any row runs or column runs. If the number $f_1$ of runs of any kind is other than zero, a determination is made that the candidate region does not contain a marker. If the number $f_1$ is zero, then the shade differences are analyzed within the candidate region to produce an $f_2$ value (block 905). The $f_2$ value is then compared with a threshold value, e.g. 0.4, and if not greater than the threshold value, a determination is made that the candidate region contains a marker. Conversely, if the $f_2$ value for the candidate region is greater than the threshold value, a determination is made that the candidate region contains information other than a marker.

While the invention has been described herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of locating a machine-readable two-dimensional marker having predetermined dimensions in a digitized image, comprising the steps of:

morphologically filling holes of said image having a first pixel polarity within regions having a second pixel polarity to produce uniformly filled regions having said second pixel polarity by identifying each hole within said image which does not completely encompass a first template having a predetermined shape and predetermined dimensions, and converting each pixel in each identified hole to said second pixel polarity;

morphologically opening said filled regions to generate a mask having one or more filled regions equal in size or larger than a second template having a predetermined shape and predetermined dimensions by identifying each filled region within said image which does not completely encompass said second template, and converting each pixel in each identified filled region to said first pixel polarity, said template being sufficient to contain said marker;

logically combining said mask with said image to extract one or more candidate regions of said image;

testing a portion of said image in said one or more candidate regions to determine whether said portion conforms to one or more properties of said marker; and based on a result of said testing, either selecting a candidate region for decoding or determining that said marker is not contained within said image.

2. The method of claim 1 wherein said method further includes the step of dilating each of said filled regions of said mask to dimensions greater than said predetermined dimensions of said marker by isotropically adding a predetermined number of pixels of said second pixel polarity to each of said filled regions.

3. The method of claim 1 wherein said step of testing said candidate regions determines whether a texture of said image therein conforms to one or more predetermined texture criteria.

4. The method of claim 1 wherein said step of testing includes attempting to decode said two-dimensional marker within said portion of said image in said candidate region.

5. The method of claim 1 wherein said step of testing includes determining whether said candidate region contains a run of uniform pixel polarity of length greater than a predetermined limit.

6. The method of claim 1 wherein said step of testing includes calculating a distribution of shade differences within said candidate regions and comparing said distribution to a predetermined threshold.

7. A method of locating a machine-readable two-dimensional marker in a digitized image having a first scale with a first resolution, said two-dimensional marker having predetermined dimensions, comprising the steps of:

scaling said image to a second scale having a reduced resolution with respect to said first resolution;

morphologically filling holes of said image having a first pixel polarity within regions having a second pixel polarity to produce uniformly filled regions having said second pixel polarity by identifying each hole within said image which does not completely encompass a first template having a predetermined shape and predetermined dimensions, and converting each pixel in each identified hole to said second pixel polarity;

morphologically opening said filled regions to generate a mask having one or more filled regions equal in size or larger than a second template having a predetermined shape and predetermined dimensions by identifying each filled region within said image which does not completely encompass said second template, and converting each pixel in each identified filled region to said first pixel polarity, said template being sufficient to contain said marker;

dilating each of said filled regions of said mask to dimensions greater than said predetermined dimensions of said marker by isotropically adding a predetermined number of pixels of said second pixel polarity to each of said filled regions;

restoring said mask to said first scale;

logically combining said mask with said image to extract one or more candidate regions of said image;

testing a portion of said image in said one or more candidate regions to determine whether said portion conforms to one or more properties of said marker; and based on a result of said testing, either selecting a candidate region for decoding or determining that said marker is not contained with said image.

8. The method of claim 7 wherein said step of testing determines whether a texture of said portion of said image conforms to one or more predetermined texture-based criteria.

9. The method of claim 7 wherein said step of testing include attempting to decode said two-dimensional marker within said portion of said image in said candidate region.

10. The method of claim 7 wherein said step of testing includes determining whether said candidate region contains a run of uniform pixel polarity of length greater than a predetermined limit.

11. The method of claim 7 wherein said step of testing includes calculating a distribution of shade differences within said candidate regions and comparing said distribution to a predetermined threshold.

* * * * *